Patented Sept. 29, 1925.

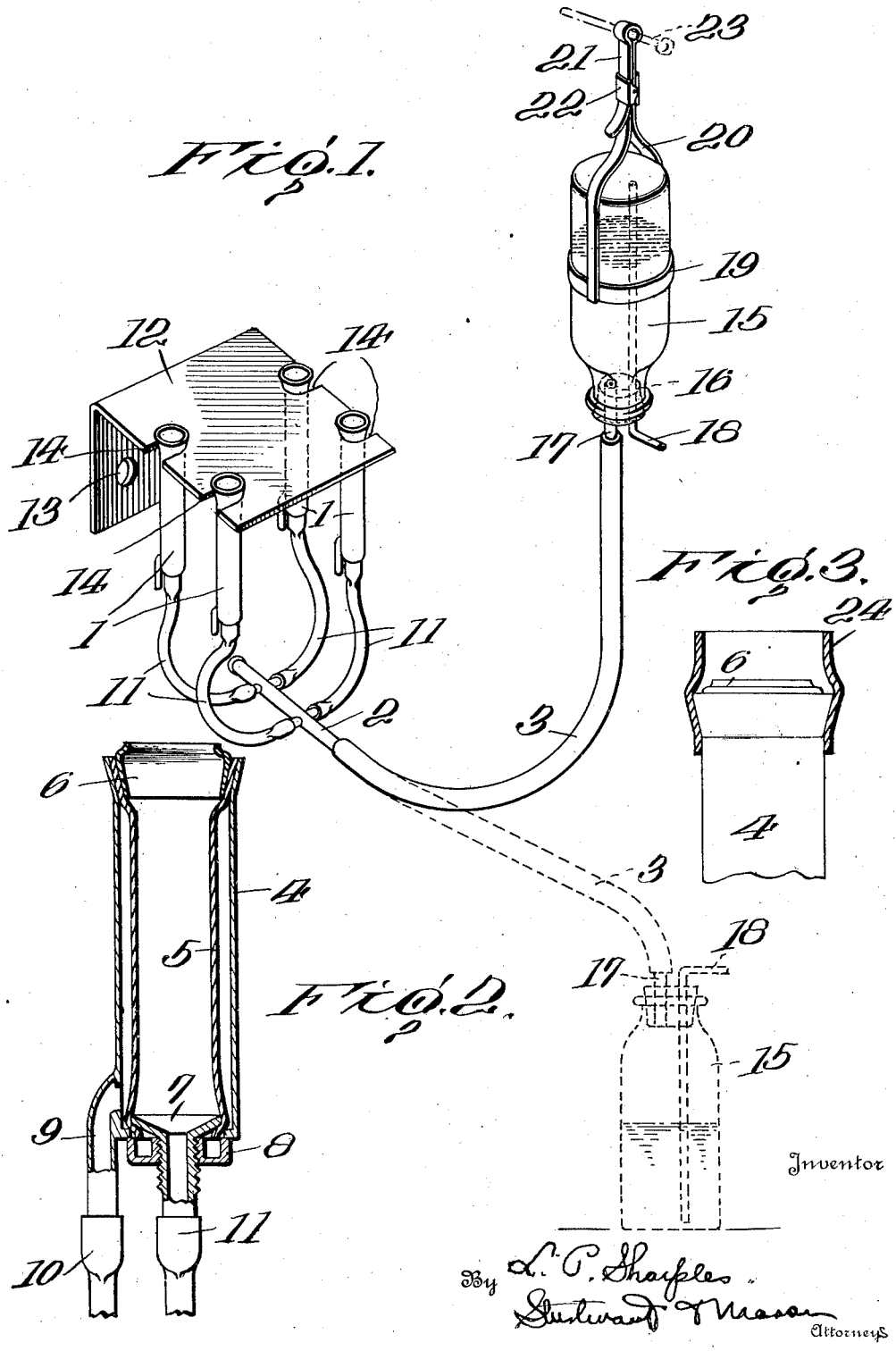

1,555,031

UNITED STATES PATENT OFFICE.

LAURENCE P. SHARPLES, OF WEST CHESTER, PENNSYLVANIA.

METHOD AND APPARATUS FOR STERILIZING THE TEAT-CUP SET OF A MILKING MACHINE.

Application filed January 12, 1923. Serial No. 612,305.

*To all whom it may concern:*

Be it known that I, LAURENCE P. SHARPLES, a citizen of the United States, residing at West Chester, in the county of Chester, State of Pennsylvania, have invented certain new and useful Improvements in Methods and Apparatus for Sterilizing the Teat-Cup Set of a Milking Machine, of which the following is a description, reference being had to the accompanying drawing and to the figures of reference marked thereon.

The invention relates to new and useful improvements in a method of cleansing and sterilizing the teat cup set of a milking machine, and the apparatus for carrying out the same.

An object of the invention is to provide a method and apparatus of cleansing and sterilizing the teat cup set of a milking machine wherein said teat cup set is so positioned that a solvent and the bactericide can be retained therein for a period of time without the possibility of trapping any air in the tube leading to the teat cups, so that all of the milk contacted parts will be subjected to the cleansing and sterilizing action of the fluid contained therein.

A further object of the invention is to provide a method and apparatus for carrying out the same wherein the cleansing and sterilizing fluid used in connection with the teat cup set is caused to cover all of the milk contacted parts of the teat cup set without requiring such a quantity of fluid as would be necessary for submerging the entire teat cup set.

A still further object of the invention is to provide a method and apparatus for carrying out the same wherein the fluid containing the solvent and bactericide will not come in contact with the outside of the teat cup set thus preventing reaction with the outside metal parts and organic matter.

These and other objects will in part be obvious and will in part be hereinafter more fully disclosed.

In the drawings which show one form of apparatus for carrying out the invention:

Figure 1 is a perspective view showing devices for supporting the teat cup set and for causing the cleansing and sterilizing fluid to pass into the teat cup set, and in dotted lines, the position of the parts when the fluid is drained therefrom;

Fig. 2 is an enlarged sectional view of one of the teat cups, and

Fig. 3 shows a slight modified form of apparatus wherein means is provided for causing the cleansing and sterilizing fluid to extend over the top of the lip at the outer end of the teat cup.

My invention is directed broadly to a method of cleansing and sterilizing the teat cup set of a milking machine, and by the teat cup set it is understood I mean the teat cups, the claw and the rubber tubing leading to the milk can.

The usual method of cleansing the teat cup set is to flush the teat cups with plain water, or in rare cases, with a washing soda solution in an effort to rinse out the solid matter, after which the teat cups are put into a bactericide until the next milking. This method is inefficient for the reason that neither the water nor the washing soda solution flushes out the dirt thoroughly. Around the teat cups there are crevices where dirt, solid matter and casein lodge, and mixed with them, and underneath them, large quantities of bacteria will be found unless great care is used. Places like these need more washing than any other part of a milking machine, or bacteria will accumulate in millions and contaminate the milk. The present method of washing out only takes the top off and does not reach into the crevices. Furthermore, by this present method of placing the teat cups in the bactericide, air is often trapped in the tube and this prevents the bactericide from making contact with the interior of the tube throughout the region where the air trapped exists.

My present method consists first in so positioning the teat cup set that a cleansing fluid may be retained therein for any desired length of time, and so that said fluid must make contact with all the interior parts in the teat cup set which are subjected to contact with the milk during milking. The invention consists, second, in using simultaneously a solvent and a bactericide which are allowed to stand in the teat cups for something like ninety percent of the life of the milking machine. In other words, when the milking is finished, the teat cup set is placed in my improved apparatus with the ends of the teat cups substantially on the same level, and also the end of the tube which is detached from the milk can on the same level, and then the tube, together with the teat cups, are filled with the cleansing and sterilizing solvent. The parts are allowed to remain in this position until again desired to use for milking. By letting the solvent and bactericide together stand in the teat cups for this long period of time, the solvent will loosen the solid matter from the surfaces to which it adheres, or any small crevices, and while the solid matter is loose, the bactericide can get in under it and kill the bacteria. The solvent of course, does not entirely dissolve the solid matter any more than soap dissolves all the dirt on your hands. The solvent does, however, loosen the solid matter from the surface to which it clings, dissolves a part of it, and allows the bactericide to get in its effective work.. If the solvent were used first and then removed, the solid matter ould again cling to the surfaces and the bactericide could not act. This is clearly demonstrated by the fact that the method of using washing soda and bactericide in series as referred to above, does not attain proper efficiency.

My improved method will possibly be better understood by reference to the apparatus shown in the drawings, which is my preferred way of carrying out the method. In the drawings, the teat cups are indicated at 1. These are connected to the usual claw 2 from which leads a tube 3 for conveying the milk to the can. In Fig. 2 of the drawings, I have shown an enlarged view of one form of teat cup, which includes an outer cylinder 4, an inner flexible member 5 connected to the cylinder 4 at the outer end by means of a cone-shaped ring 6, which ring is adapted to receive the teat. This flexible member 5 is clamped between the lower end of the cylinder 4 and a cone-shaped nipple 7. A threaded nut 8 which engages a thread on the stem of the nipple 7 clamps the parts together. A tube 11 is connected to the stem of the nipple 7 and this tube is connected at its other end to the claw 2. It is understood, of course, that there is a tube 11 for each teat cup. Extending from one side of the cylinder 4 is a tube 9 to which an air pressure pipe 10 is connected. This air pipe 10 has been omitted from Fig. 1 of the drawings so as not to confuse the drawing. The milk, of course, does not make contact with the tube 10 and it is not necessary to sterilize the interior of the same. This teat cup set is of the usual construction and further description thereof is not thought necessary.

It will be noted that there are crevices about the connected parts of the teat cup where dirt, solid matter and casein lodge, and these are the parts which it is especially difficult to properly cleanse and sterilize.

My apparatus includes a bracket 12 which may be secured to the wall at any convenient place by screws or bolts which pass through suitable openings 13. In the horizontal portion of the bracket there are slots 14, one for each teat cup, and these slots are preferably of such width as to engage underneath the extreme tapered end of the teat cup and support the same as clearly shown in Fig. 1 of the drawing. When the teat cups are placed in the bracket the upper ends of the same are on the same horizontal level. My apparatus also includes a container 15 herein shown in the form of a wide mouth glass bottle. In said bottle is a cork 16 having a tube 17 leading therethrough to which the tube 3 may be connected. There is also a vent pipe 18 extending from the cork which leads to a point near the bottom of the bottle. The bottle is provided with a belt strap 19 to which is attached a supporting strap 20. This supporting strap has a loop 21 formed therein, and the free end thereof is adapted to pass through an ordinary belt buckle. The loop can be placed over a nail or other suitable support 23 and thus the bottle supported in inverted position. The bottle may have a collar or flange formed therein underneath which the belt extends so that the bottle will not slip out of the belt. In this bottle is placed the cleansing and sterilizing fluid.

This cleansing and sterilizing fluid may consist of washing soda or some other form of cleansing fluid and a chloramine or any other form of bactericide. The two are mixed and operate simultaneously to loosen and dissolve the solid matter and to thoroughly sterilize the parts of the milk contacted portions on the interior of the teat cup set.

The bottle is placed on a nail in inverted position as shown in Fig. 1 and the bottle is adjusted so that the fluid will pass into the tube 3 and rise in the teat cups to the point of overflowing so that the teat cups will be completely filled with the fluid. The teat cup set is allowed to remain in this position until it is desired to use the same again. So it is that the teat cup set may be subjected to the action of the cleansing and sterilizing fluid for a period of approximately twenty-two hours out of twenty-four. When it is desired to use the teat cup set, the bottle is removed from the nail and placed in the dotted line position shown in Fig. 1, where the fluid will all run back into the bottle thus emptying the teat cup set and preserving the fluid for further use. It will be noted that the teat cup set is positioned so as to retain the cleansing fluid without any possible chance of air being trapped in any of the parts of the teat cup set. It will also be noted that the teat cup set is subjected on the interior thereof to the cleansing and sterilizing fluid without requiring the teat cup set to be submerged in said fluid, and thus a relatively small amount of fluid may be used.

In Fig. 3 I have shown a slightly modified form of apparatus, wherein the rubber extension sleeve 24 is attached to the outer end of each teat cup before it is placed in the supporting bracket, and then the cleansing and sterilizing fluid is so positioned as to fill not only the teat cup, but the extension sleeve to the point of overflowing, and this insures that the extreme outer edge of the teat cup will be submerged, thoroughly cleansed and sterilized.

It will be understood, of course, that other forms of apparatus may be used for carrying out the invention; that the two essential features of the invention consist, on the one hand, in the simultaneous use of the cleansing fluid and sterilizing fluid, and on the other hand, the positioning of the teat cup set so as to insure that all of the interior parts are caused to be subjected to the cleansing and sterilizing fluid.

It is obvious that minor changes in the details of construction and the arrangement of the parts may be made without departing from the spirit of the invention as set forth in the appended claims.

Having thus described the invention, what I claim as new and desire to secure by Letters-Patent, is—

1. The combination of means for holding the teat cup set with the open ends of the teat cups uppermost and on substantially the same level, a liquid container adapted to be connected to the tube of a teat cup set, and means for supporting said container whereby the fluid in the container can flow into and cover all the interior parts of the teat cup set and be retained in said teat cup set.

2. The combination of means for holding the teat cup set with the open ends of the teat cups uppermost and on substantially the same level, a liquid container adapted to be connected to the tube of a teat cup set, means for supporting said container whereby the fluid in the container can flow into and cover all the interior parts of the teat cup set and be retained in said teat cup set, said container being adapted to be lowered from its support so that the fluid in the teat cup set will run back into the container emptying the same.

3. The combination of means for supporting the teat cups of a teat cup set with the open ends uppermost and on substantially the same level, a flexible sleeve adapted to be attached to each teat cup and extend beyond the end thereof, a container adapted to be attached to the tube of the teat cup set, and means for supporting said container whereby a cleansing and sterilizing fluid contained therein may be caused to flow into said teat cup set and above the top of the teat cups into said flexible sleeves and retained therein for a period of time.

In testimony whereof, I affix my signature.

LAURENCE P. SHARPLES.